United States Patent [19]

Darr

[11] Patent Number: 4,721,451

[45] Date of Patent: Jan. 26, 1988

[54] IN-MOLD LABEL DISPENSER FOR PLASTIC BLOW MOLDING

[75] Inventor: Richard C. Darr, Seville, Ohio

[73] Assignee: Plastipak Packaging, Inc., Plymouth, Mich.

[21] Appl. No.: 33,069

[22] Filed: Mar. 31, 1987

[51] Int. Cl.$^4$ .................. B29C 49/04; B29C 49/24
[52] U.S. Cl. .................. 425/503; 264/509; 425/126 R; 425/504; 425/522
[58] Field of Search .............. 264/509; 271/103, 106, 271/107; 425/126 R, 503, 504, 522, 539, 540

[56] References Cited

U.S. PATENT DOCUMENTS

| | | | |
|---|---|---|---|
| 3,292,209 | 12/1966 | Borkmann | 425/126 R |
| 3,324,508 | 6/1967 | Dickinson | 425/126 R |
| 4,355,967 | 10/1982 | Hellmer | 425/503 |
| 4,359,314 | 11/1982 | Hellmer | 425/503 |
| 4,397,625 | 8/1983 | Hellmer et al. | 425/503 |
| 4,479,644 | 10/1984 | Bartimes et al. | 271/107 |
| 4,479,770 | 10/1984 | Slat et al. | 425/503 |
| 4,479,771 | 10/1984 | Slat et al. | 425/503 |
| 4,498,854 | 2/1985 | Ross | 425/116 |
| 4,585,408 | 4/1986 | Darr | 425/503 |
| 4,639,206 | 1/1987 | Darr | 425/503 |
| 4,639,207 | 1/1987 | Slat et al. | 425/503 |

Primary Examiner—Jay H. Woo
Assistant Examiner—Timothy W. Heitbrink
Attorney, Agent, or Firm—Brooks & Kushman

[57] ABSTRACT

An in-mold label dispenser (10) is disclosed as including a label carrier shuttle (40) moved by an operator (46) mounted on a support (36) that is moved rectilinearly on a slideway assembly (34) by an actuator (38) between an aligned position with respect to an open mold (14) and a label transfer position. Label carriers (44) on the shuttle (40) transfer labels (32) from associated label magazines (30) to mold cavity sections (18) in order to perform an in-mold labeling operation of a plastic blow molding machine. A first locator (42) on the shuttle (40) and a second locator (48) mounted for rectilinear movement on the opposite side of the mold from the shuttle are engaged as the shuttle is moved to an inserted position with respect to the open mold. A second actuator (50) moves the second locator (48) between a mold aligned position and a transfer position with the locators engaged so as to provide the labeling operation of the mold.

16 Claims, 4 Drawing Figures

IN-MOLD LABEL DISPENSER FOR PLASTIC BLOW MOLDING

TECHNICAL FIELD

This invention relates to an in-mold label dispenser for use in plastic blow molding.

BACKGROUND ART

Blow molding machines conventionally provide a parison, i.e. a tube of hot plastic, between open sections of a mold. Closing of the mold then clamps the parison and allows air to be blown into the parison such that it assumes the shape of the mold. After suitable cooling has taken place, the mold sections are opened to allow ejection of the molded part.

Blow molded parts such as containers have conventionally included paper labels that are glued thereto after the molding to identify the contents of the container to the consumer. One problem is that such paper labels can becomes wrinkled if dampened and can also become detached from the container if a waterproof glue is not used. Also, paper labels require a separate labeling step after the molding which thus adds to the cost of the container.

In-mold labeling has been developed in the recent past to provide superior bonding of labels to blow molded plastic parts. This in-mold labeling is performed by initially inserting a label within the mold prior to the introduction of the parison and by then closing sections of the mold in preparation for the blowing operation. The subsequent blowing operation forms the parison around the label to the shape of the mold and provides a permanent bond which is incapable of being broken by moisture or otherwise. Also, such in-mold labeling provides a smooth transition between the label and the adjacent surface of the molded plastic part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated or other beverages, it is believed that in-mold labeling reduces the flow of carbon dioxide and other fluids through the container wall over a period of time and thereby increases the shelf life.

Prior in-mold label dispensers for blow molding machines conventionally include a label carrier having a vacuum cup that receives a label from a label magazine and is then moved to deposit the label within the mold cavity whereupon termination of a vacuum drawn at the vacuum cup allows a vacuum drawn at the mold cavity to secure the label in position in preparation for the blow molding. Such vacuum type label carriers have previously been mounted on linkages that move the labels in an angular path with respect to the direction of opening and closing movement of mold sections of the mold in order to permit depositing of the labels in the confined space permitted by the extent of the mold opening. With the linkage type of label carrier, only one label can be deposited within the mold at a given time since movement thereof on the linkage toward one mold section interferes with movement of a similar linkage toward an opposed mold section for depositing another label.

Another prior art type of in-mold label dispenser is disclosed by U.S. Pat. Nos. 4,355,967 and 4,359,314 and includes a label carrier that is moved along an abruptly curved path by a complex linkage which executes a 180 degree turn in order to transfer labels from a label magazine to the mold in preparation for molding. With this complex linkage type label dispenser, it is likewise not possible to deposit more than one label in the mold at a given time due to the limited space present upon opening of the mold.

U.S. Pat. Nos. 3,292,209, 4,397,625, and 4,498,854 disclose in-mold label dispensers wherein fluid motors move label carriages and/or label carriers on the carriages to transfer labels from label stacks into associated molds.

U.S. Pat. No. 3,324,508 discloses an in-mold label dispenser wherein a linkage moves labels from rolls of labels to a mold where the labels are held by an electrostatic charge prior to the blow molding operation.

U.S. Pat. Nos. 4,479,770, 4,479,771, and 4,639,207 of William A. Slat, et al disclose in-mold label dispensers wherein a first solid mechanical drive moves a dispensing head between inserted and withdrawn positions with respect to an open mold and wherein a second solid mechanical drive extends and retracts label carriers in order to perform the labeling operation. Use of such solid mechanical drives to move the dispensing head and the label carriers permits accurate positioning of the labels.

U.S. Pat. No. 4,479,644 discloses another type of in-mold label dispenser for use with a plastic blow molding machine.

U.S. Pat. Nos. 4,585,408 and 4,639,206 of Richard C. Darr disclose in-mold label dispensers for plastic blow molding wherein a dispensing head is moved with rectilinear motion between withdrawn and inserted positions and is moved with arcuate motion between an aligned position with respect to the open mold and a label transfer position. The in-mold label dispenser of U.S. Pat. No. 4,585,408 has an elongated support that mounts the dispensing head for its rectilinear movement and provides a pivotal axis about which the dispensing head rotates between the aligned and transfer positions. In the U.S. Pat. No. 4,639,206, a pair of locators mounted by base portions on opposite sides of the mold are engaged with each other as the dispensing head is moved to its inserted position to thereby provide support in locating the dispensing head prior to its arcuate movement to the label transfer position for dispensing of labels. With both of these dispensers, the arcuate movement of the dispensing head between its mold aligned and transfer positions does not permit labeling of certain mold constructions since the degree to which the dispensing head can move arcuately is limited by the mold construction and the construction of cavity sections within the mold.

DISCLOSURE OF INVENTION

An object of the present invention is to provide an improved in-mold label dispenser that can function with mold constructions in a manner not heretofore possible. While the in-mold label dispenser can be used with a single cavity mold, it has particular utility for use with a multiple cavity mold to supply at least one label to each cavity during each blow molding cycle. A pair of the in-mold label dispensers are also usable to provide at least one label to each cavity section of each mold section of the mold during the labeling operation.

The in-mold label dispenser according to the invention is utilized with a plastic blow molding machine including a mold having a pair of mold sections each of which includes one or more cavity sections. The mold sections are movable toward and away from each other between an open position spaced from each other and a closed position where the cavity sections thereof cooperate to define one or more enclosed cavities in which blow molding is performed.

The in-mold label dispenser of the invention includes a base having first and second portions located on opposite sides of the mold. At least one label magazine is mounted on the first base portion on one side of the mold. A rectilinear slideway of the in-mold label dispenser is mounted on the first base portion and a support of the dispenser is mounted by the rectilinear slideway assembly on the first base portion for rectilinear movement. A first actuator of the dispenser moves the support rectilinearly on the slideway assembly between an aligned position with respect to the open mold and a label transfer position. A shuttle of the dispenser is mounted on the support for rectilinear movement therewith and for rectilinear movement with respect thereto toward and away from the mold. The shuttle includes a first locator, and at least one label carrier is mounted on the shuttle in a fixed relationship with respect thereto and is operable to carry a label for transfer from the label magazine to the mold. An operator of the dispenser is mounted for movement on the support and is connected to the shuttle to move the shuttle between withdrawn and inserted positions with respect to the mold. This shuttle is located adjacent the label magazine in the withdrawn position to permit the label carrier thereon to receive a label from the magazine. With the label on the label carrier, the operator moves the shuttle to the inserted position with the support position by the first actuator in the aligned position to position the label carrier and the label carried thereby between the mold sections of the open mold. A second locator of the dispenser is mounted on the second base portion for rectilinear movement parallel to the rectilinear movement of the support on the first base portion. A second actuator moves the second locator rectilinearly between an aligned position with respect to the open mold and a transfer position. Upon movement of the shuttle to the inserted position with the first and second actuators providing the positioning in the aligned positions, the first and second locators are engaged with each other to thereby provide accuracy in the placement of labels. After such engagement, the first and second actuators move the support rectilinearly to the transfer position where the label on the label carrier is transferred to one of the mold cavity sections. A control of the dispenser operates the first and second actuators and the operator in coordination with each other to provide the transfer of labels from the magazine to the mold.

In the preferred embodiment of the in-mold label dispenser disclosed, the carriage includes a plurality of label carriers for supplying labels to a multiple cavity type mold of the blow molding machine. Also, the in-mold label dispenser is disclosed as having a plurality of the label magazines fixedly mounted on the base and located so as to supply labels to the label carriers on the shuttle upon rectilinear movement of the support from the aligned position to the transfer position with the shuttle in the withdrawn position with respect to the mold. A pair of such label dispensers are disclosed for use with each other in order to supply labels to both mold sections in order to provide the capability of labeling both sides of containers blow molded with the in-mold labeling operation.

Preferably, the first actuator of the in-mold label dispenser is embodied by an air cylinder having one end connected to the first base portion and another end connected to the support such that retraction and extension thereof moves the support rectilinearly between the aligned and transfer positions. The operator is also embodied by an air cylinder having one end mounted on the support and another end connected to the shuttle to provide movement of the shuttle between the withdrawn and inserted positions with respect to the mold. On the opposite side of the mold from the first base portion where the first actuator is located, the second actuator is preferably embodied by an air cylinder having one end connected to the second base portion and another end connected to the second locator to provide movement thereof between the aligned and transfer positions.

In the preferred construction disclosed, the operator cylinder includes a track and the shuttle includes a slide that mounts the shuttle on the operator cylinder track for movement between the withdrawn and inserted positions with respect to the mold. Thus, as the operator cylinder is extended and retracted, the shuttle slide moves along the track in opposite directions.

Operation of the in-mold label dispenser is preferably achieved by providing the control with a first sensor for sensing movement of the shuttle slide on the track to the withdrawn position. The control also preferably includes a second sensor that senses the engagement of the locators with each other as the shuttle is moved on the track to the inserted position with respect to the open mold.

In addition to the slide, the shuttle also preferably includes a skid as well as a guide that connects the skid to the operator cylinder to provide guided movement of the shuttle skid. A connector of the in-mold label dispenser connects the operator cylinder to the skid and a track connection member extends from the connector and has a distal end secured to the slide which is movable along the track of the operator cylinder. A label carrier connection member also extends from the connector to connect the label carriers. In the preferred construction, the connector has an elongated shape that extends vertically between the skid, the operator cylinder, the track connection member, and the label carrier connection member.

In the preferred construction disclosed, the slideway assembly includes a pair of spaced slideways mounted on the first base portion in a spaced relationship to each other. Each of the slideways includes an elongated slideway rod and a pair of mounts that support the slideway rod on the first base portion in a spaced relationship.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
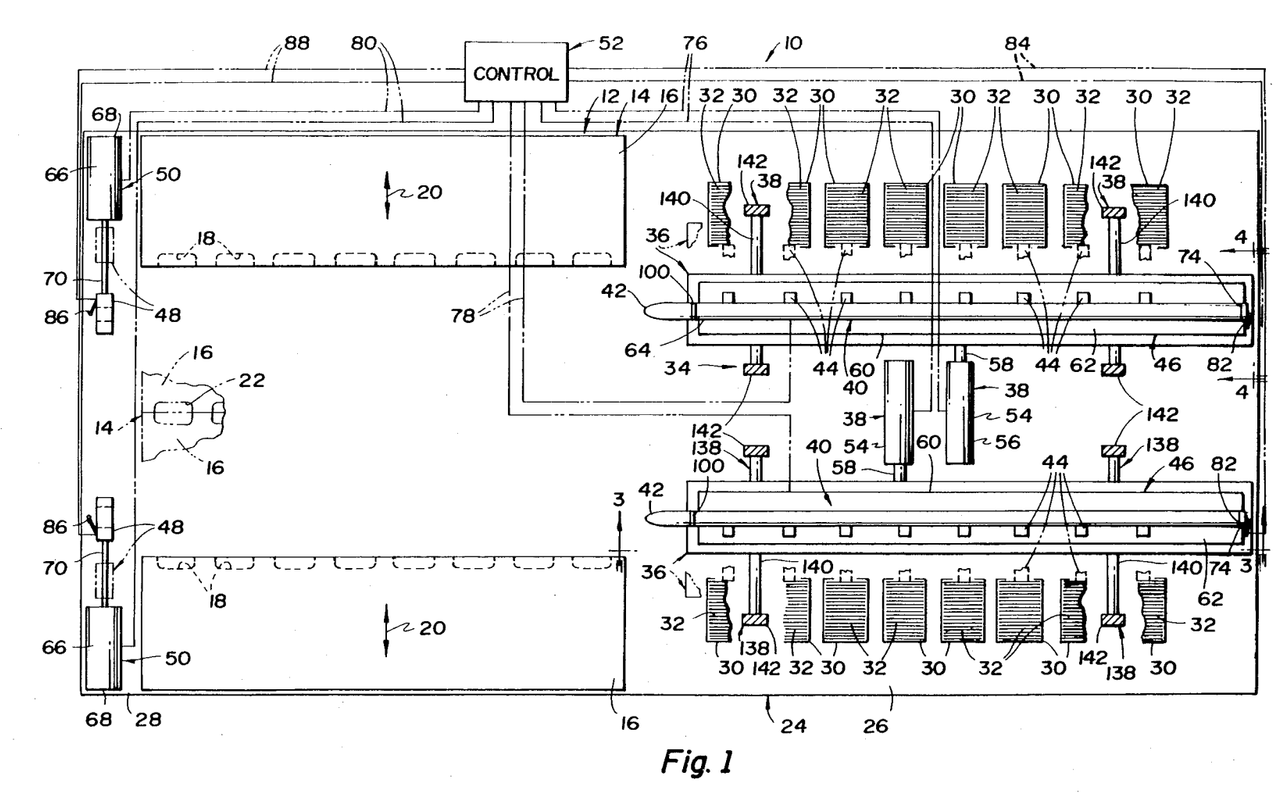
FIG. 1 is a schematic top plan view of an in-mold label dispenser constructed in accordance with the present invention and illustrated with a shuttle of the dispenser shown in a withdrawn position with respect to an open mold.

With reference to FIG. 1 of the drawings, an in-mold label dispenser constructed in accordance with the invention is generally indicated by 10 and is used with a plastic blow molding machine 12 having a mold 14 which includes a pair of mold sections 16. Each of the mold sections 16 includes at least one cavity section 18 and preferably includes a plurality of such cavity sections as illustrated since the in-mold label dispenser 10 has particular utility when utilized to provide in-mold labeling of multiple cavity molds as is hereinafter more fully described. Mold sections 16 are mounted by the machine for movement in opposite directions as shown by arrows 20 between the solid line indicated open position spaced from each other and the phantom line indicated closed position where each associated pair of cavity sections cooperate to provide an enclosed cavity 22 in which blow molding is performed after the initial in-mold labeling operation. Also, as illustrated, the in-mold label dispenser provides in-mold labeling of the cavity sections 18 of both mold sections 16 in order to permit labels to be provided on both sides of a container blow molded within the mold.

With continuing reference to FIG. 1, the in-mold label dispenser 10 is disclosed as including a base 24 having first and second portions 26 and 28 located on opposite sides of the mold 14. A plurality of label magazines 30 are illustrated mounted on the first base portion 26, and each is constructed to store a plurality of stacked labels 32 for providing the in-mold labeling operation of the mold 14.

A pair of rectilinear slideway assemblies 34 are respectively associated with the pair of mold sections 16 and are mounted on the first base portion 26 adjacent the label magazines 30. A pair of supports 36 are respectively mounted by the pair of rectilinear slideway assemblies 34 on the first base portion 26 for rectilinear movement as is hereinafter more fully described. A pair of first actuators 38 respectively move the pair of supports 36 rectilinearly on the slideway assemblies 34 between a solid line indicated aligned position with respect to the open mold 14 and a phantom line indicated label transfer position.

Figure 2:
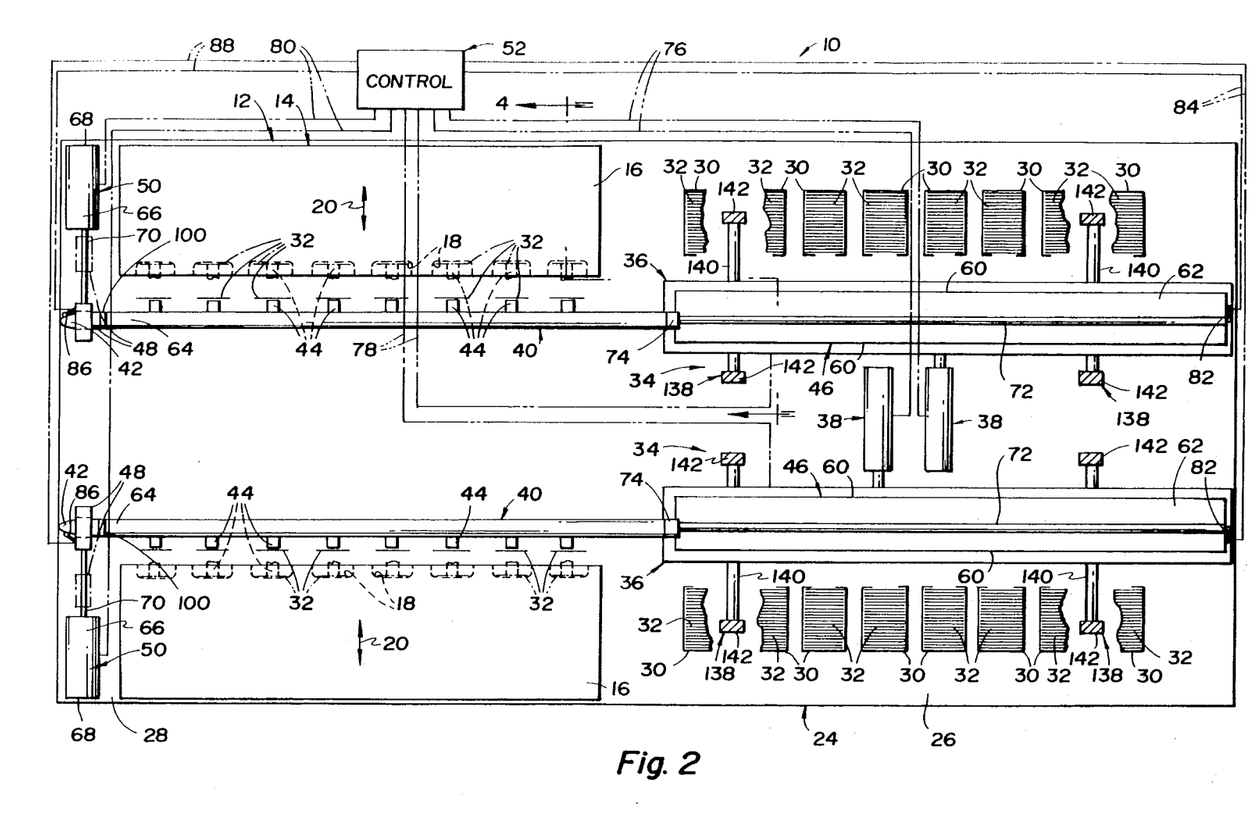
FIG. 2 is a schematic top plan view of the in-mold label dispenser and is similar to FIG. 1 but has the shuttle illustrated in an inserted position with respect to the open mold.

As illustrated in both FIGS. 1 and 2, the in-mold label dispenser includes a shuttle 40 mounted on each support 36 for rectilinear movement therewith between the aligned and transfer positions and for rectilinear movement with respect thereto toward and away from the mold 14. Each shuttle 40 includes a first locator 42 and a number of label carriers 44 corresponding to the number of cavity sections 18 of the associated mold section. The label carriers 44 are mounted on the associated shuttle 40 in a fixed relationship with respect thereto and are operable to carry labels 32 for transfer from the label magazines 30 to the mold 14 in order to perform the in-mold labeling operation. An operator 46 is mounted for movement on each support 36 and is connected to the associated shuttle 40 to move the shuttle between the withdrawn position of FIG. 1 and the inserted position of FIG. 2 in a manner which is hereinafter more fully described.

With reference to FIG. 1, each operator 46 positions the associated shuttle 40 in the withdrawn position in proximity to the associated set of label magazines 30 to permit the label carriers 44 thereon to receive labels 32. This labeling operation is disclosed as being performed by operation of the actuators 38 to move the supports 36 to the phantom line position where the label carriers 46 receive the labels 32 by a conventional vacuum securement. Thereafter, the actuators 38 move the associated supports 36 to the mold aligned position shown by solid line representation and the operators 46 then move the shuttles 40 to the inserted position of FIG. 2 to position the label carriers 44 and the labels 32 thereon between the mold sections 16.

As shown in both FIGS. 1 and 2, a pair of second locators 48 are mounted on the second base portion 28 for rectilinear movement parallel to the rectilinear movement of the support 36 on the first base portion 26. A pair of second actuators 50 respectively move the pair of second locators 48 between the solid line indicated aligned position with respect to the open mold and the phantom line indicated transfer position. The first and second locators 42 and 48 are engaged with each other in a mating relationship as the shuttle 40 is moved to the inserted position with the first and second actuators 38 and 50 providing the positioning in the aligned positions as shown by solid line representation. Operation of the first and second actuators 38 and 50 moves the support 36 and the engaged locators 42 and 48 rectilinearly to the transfer position where the labels 32 on the label carriers 44 are transferred to the mold cavity sections 18. The vacuum supplied to the label carriers 44 in the transfer position is terminated and a vacuum is drawn at the mold cavity sections 18 to thus secure the labels in preparation for the mold molding process after closing of the mold.

As shown in both FIGS. 1 and 2, a control 52 of the in-mold label dispenser operates the first and second actuators 38 and 50 and the operators 46 in coordination with each other as is hereinafter more fully described to provide transfer of the labels 32 from the label magazines 30 to the mold 14.

As previously mentioned, the in-mold label dispenser 10 can be utilized with only a single shuttle 40 and associated components to provide in-mold labeling of only one of the mold sections 16 when only one side of the container being blow molded must be labeled. As also previously mentioned, the in-mold label dispenser 10 has particular utility when utilized with a multiple cavity mold 14 but is also usable with a single cavity mold.

With reference to FIG. 1, the label magazines 30 are fixedly mounted on the first portion 26 of base 24 by suitable unshown adjusters that permit adjustment thereof to provide proper registration with the mold cavities. The label magazines 30 are located so as to supply the labels 32 to the label carriers 44 on each shuttle 40 upon rectilinear movement of the associated support 36 from the aligned position shown by solid line representation to the phantom line indicated transfer position. This pick-up operation of the label takes places with the shuttle 40 in the withdrawn position and is followed by movement of the shuttle under the operation of the associated actuator 38 back to the aligned position with respect to the open mold in preparation for the movement of the shuttle to the inserted position shown in FIG. 2 as previously described.

As shown in both FIGS. 1 and 2, each first actuator 38 is preferably embodied by an air cylinder 54 having a cylinder body end 56 connected in any suitable manner to the first base portion 26 and having another piston connecting rod end 58 connected in any suitable manner to the associated support 36. Extension and retraction of the first actuator cylinders 38 thus moves the supports 36 and the associated shuttles 40 with the label carriers 44 between the mold aligned and label transfer positions as previously described.

Figure 3:
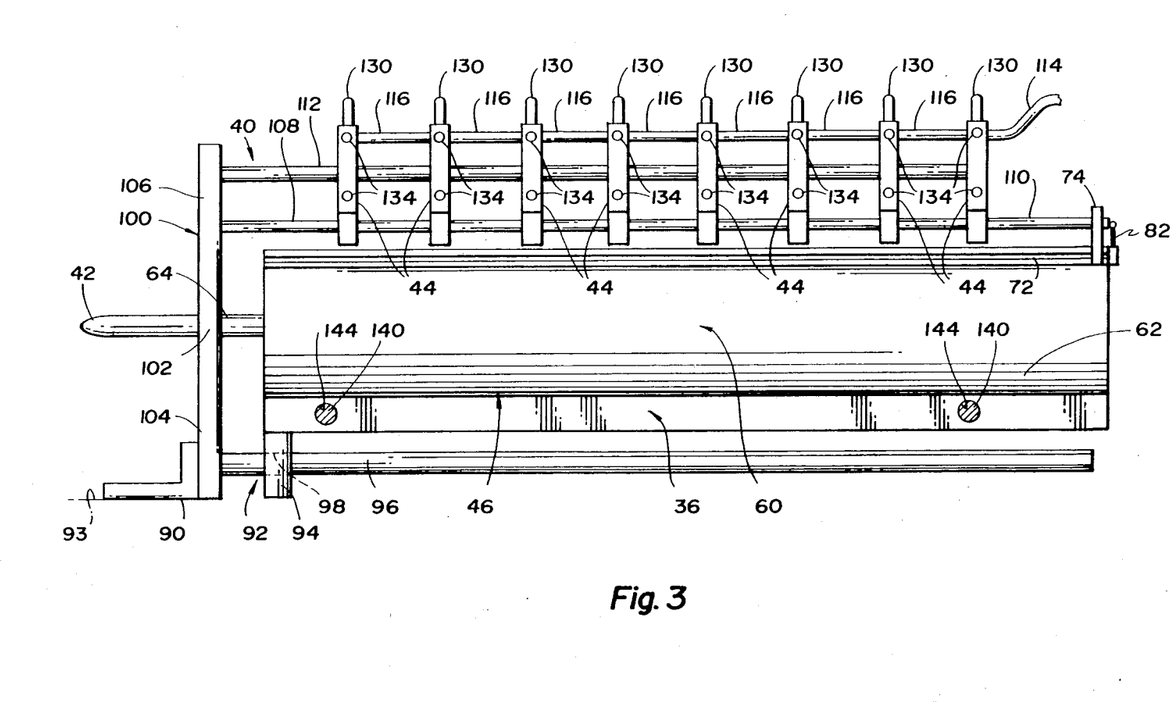
FIG. 3 is an elevational view illustrating the in-mold label dispenser taken along the direction of line 313 3 of FIG. 1.
Figure 4:
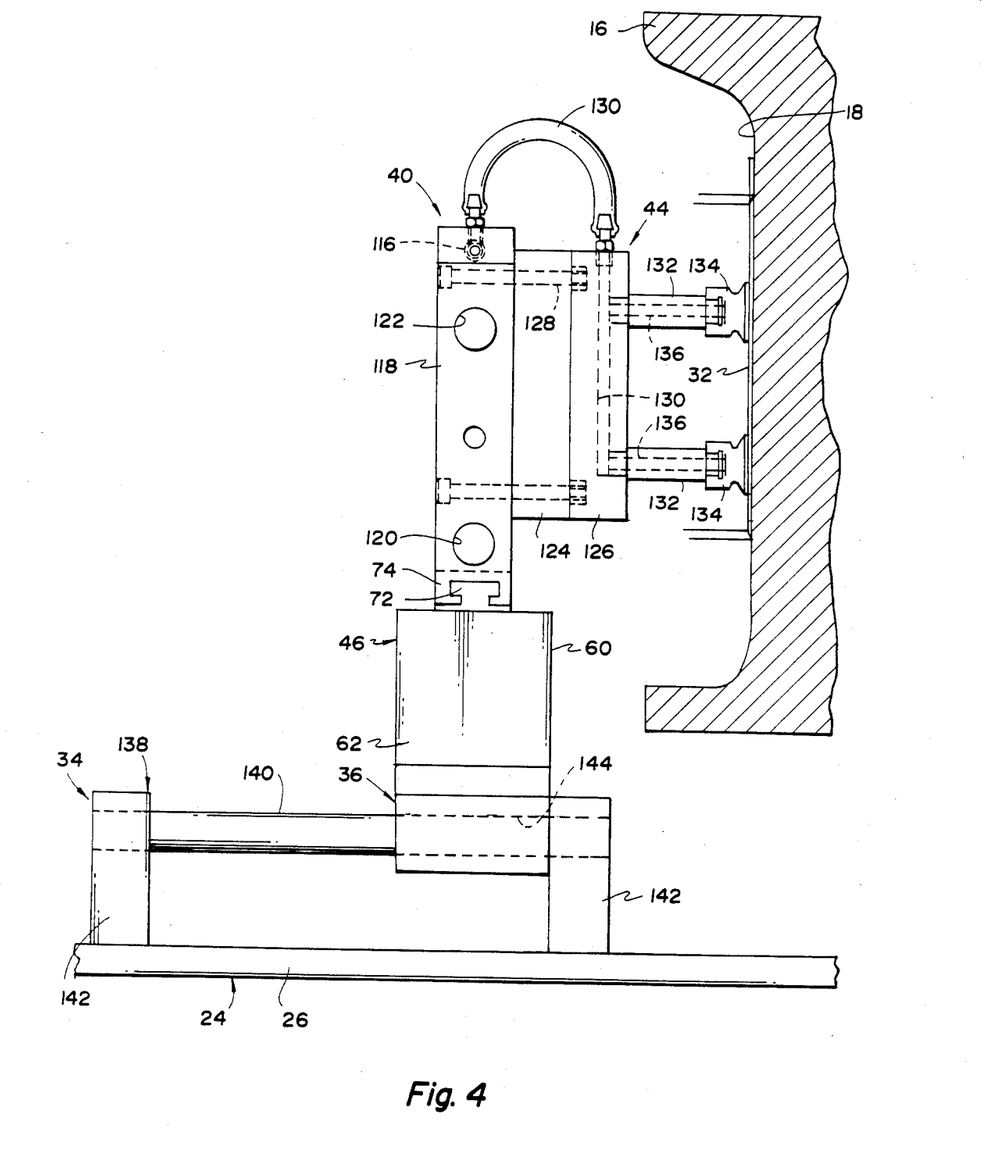
FIG. 4 is an elevational view of the in-mold label dispenser taken along the direction of line 4—4 in FIG. 1.

As also shown in FIGS. 1 and 2, each operator 46 is also preferably embodied by an air cylinder 60 having one cylinder body end 62 that is mounted on the top of the associated support 36 as also shown in FIGS. 3 and 4. The other piston connecting rod end 64 of each air cylinder operator is connected to the shuttle 40 as is hereinafter more fully described. Extension and retraction of the air cylinder 60 of each operator provides the movement of the shuttle 40 between the withdrawn position with respect to the open mold as shown in FIG. 1 and the inserted position between the molds as shown in FIG. 2.

On the opposite side of the mold 14 from the pair of first actuators 38 and the pair of operators 46, the pair of second actuators 50 are each preferably embodied by an air cylinder 66 having a cylinder body end 68 connected in any suitable manner to the second base portion 28 and having another piston connecting rod end 70 connected to the associated second locator 48. Extension and retraction of the air cylinders 66 of the second actuators 50 provides movement of the second locators 48 between the solid line indicated aligned position with respect to the open mold and the phantom line indicated transfer position as previously described.

With reference to FIGS. 2, 3, and 4, the operator cylinder 46 includes a track 72 that is mounted on its upper side extending along the length thereof with a T-shaped cross section as shown in FIG. 4. Shuttle 40 includes a slide 74 that mounts the shuttle on the track 72 for movement between the withdrawn and inserted positions with respect to the mold.

With reference to FIGS. 1 through 3, the control 52 includes suitable control connections 76 to the pair of first actuators 38, suitable control connections 78 to the pair of operators 46, and suitable control connections 80 to the pair of second actuators 50. Control 52 also includes a pair of first sensors 82 for sensing the movement of the shuttle 40 to the withdrawn position. These sensors 82 have suitable control connections 84 to the control 52 and preferably operate by sensing the movement of the shuttle slide 74 on the track 72 to the withdrawn position as shown in both FIGS. 1 and 3. In addition, control 52 includes a pair of second sensors 83 that sense the engagement of the locators 42 and 48 with each other as the shuttle is moved to the inserted position. Suitable control connections 88 preferably connect the second sensors 86 with the control 52.

As shown in FIG. 3, the shuttle 40 includes a skid 90 that has a generally L-shaped configuration rotated ninety degrees from the vertical. A guide 92 connects the skid 90 to the support 36 so as to provide guided movement of the shuttle skid on a machine surface 93. This guide includes a guide support portion 94 that projects downwardly from the support 36 at the end thereof which is adjacent the mold. In addition, the skid guide 92 includes an elongated guide rod 96 that projects from the skid through an opening 98 in the guide support portion 94 to provide the guided skid movement.

With continuing reference to FIG. 3, the shuttle 40 of the in-mold label dispenser also preferably includes a connector 100 having an intermediate portion 102 that is connected to the operator cylinder 60 at its piston connecting rod end 64 adjacent the first locator 42 which has a somewhat rounded, pointed shape. Connector 100 also has a lower end 104 that is connected to the skid 90 and has an upper end 106 from which a track connection member 108 extends away from the connector. This track connection member 108 has a distal end 110 secured to the slide 74 which is movable along the cylinder track 72 as previously described. Shuttle 40 also includes a label carrier connection member 112 that extends from the upper end 106 of the connector and connects the label carriers 44 in cooperation with the track connection member 108 to provide fixed positioning of the label carriers on the shuttle.

A vacuum conduit 114 to the shuttle is connected by suitable hose conduits 116 as shown in FIG. 3 extending between the label carriers 44 at a location above the label connection member 112. As shown in FIG. 4, each label carrier 44 includes a main carrier member 118 having holes 120 and 122 in which the track connection member 108 and label carrier connection member 112 are secured in a fixed relationship. A pair of label carrier blocks 124 and 126 are secured to each carrier member 118 by a pair of threaded connections 128. An upwardly projecting hose conduit 130 extends from a fitting that is fed vacuum by the conduits 116 as previously described to a fitting that feeds a vertical passage 130 in the outermost block 126 of the label carrier. Upper and lower label carrier projections 132 extend outwardly from the block 126 and have vacuum cups 134 which are fed a vacuum through passages 136 connected to the vertical vacuum passage 130.

Accurate positioning of the vacuum cups 134 illustrated in FIG. 4 is provided by the construction of the connector 100 previously described in connection with FIG. 3. Specifically, the connector 100 has an elongated shape that extends vertically between the skid 90, the piston connecting rod end 64 of the operator cylinder 60, the track connection member 108, and the label carrier connection member 112. Also, as previously mentioned, the label carriers 44 can be provided with suction cups 134 for supplying a single label to each mold cavity or two or more labels if necessary.

As shown in FIGS. 1 and 2, each slideway assembly 34 includes a pair of spaced slideways 138 mounted on the first base portion 26 in a spaced relationship to each other generally adjacent the opposite ends of the elongated configuration of the support 36. These slideways 138 as shown in FIG. 4 each include an elongated slideway rod 140 and a pair of mounts 142 that support the opposite ends of the associated slideway rod on the first base portion 26 in an upwardly spaced relationship. The shuttle support 36 has a slideway opening 144 that receives each slideway rod 140 to provide the rectilinear mounting thereof for the rectilinear movement of the support 36 and the shuttle 40 as previously described under the air cylinder actuated movement.

While the best mode for carrying out the invention has been described in detail, those familiar with the art to which this invention relates will recognize various alternative designs and embodiments for carrying out the invention as defined by the following claims.

What is claimed is:

1. An in-mold label dispenser for a plastic blow molding machine including a mold having a pair of mold sections each of which includes a cavity section, and said mold sections being movable toward and away from each other between an open position spaced from each other and a closed position where the cavity sections thereof cooperate to define an enclosed cavity in which blow molding is performed, the in-mold label dispenser comprising: a base having first and second portions located on opposite sides of the mold; a label magazine mounted on the first base portion on one side of the mold; a rectilinear slideway assembly mounted on the first base portion; a support mounted by the rectilinear slideway assembly on the first base portion for rectilinear movement; a first actuator that moves the support rectilinearly on the slideway assembly between an aligned position with respect to the open mold and a label transfer position; a shuttle mounted on the support for rectilinear movement therewith and for rectilinear movement with respect thereto toward and away from the mold; the shuttle including a first locator; at least one label carrier mounted on the shuttle in a fixed relationship with respect thereto and being operable to carry a label for transfer from the label magazine to the mold; an operator mounted for movement on the support and being connected to the shuttle to move the shuttle between withdrawn and inserted positions with respect to the mold; said shuttle being located adjacent the label magazine in the withdrawn position to permit the label carrier thereon to receive a label therefrom; the operator then moving the shuttle to the inserted position with the support positioned by the first actuator in the aligned position to position the label carrier and the label carried thereby between the mold sections of the open mold; a second locator mounted on the second base portion for rectilinear movement parallel to the rectilinear movement of the support on the first base portion; a second actuator that moves the second locator rectilinearly between an aligned position with respect to the open mold and a transfer position; the first and second locators being engaged as the shuttle is moved to the inserted position with the first and second actuators providing the positioning in the aligned positions; the first and second actuators moving the support and the engaged locators rectilinearly to the transfer position where the label on the label carrier is transferred to one of the mold cavity sections; and a control for operating the first and second actuators and the operator in coordination with each other to provide the transfer of labels from the magazine to the mold.

2. An in-mold label dispenser as in claim 1 which the shuttle includes a plurality of label carriers for supplying labels to a multiple cavity type mold of the blow molding machine.

3. An in-mold label dispenser as in claim 2 which includes a plurality of the label magazines fixed mounted on the base and located so as to supply labels to the label carriers on the shuttle upon rectilinear movement of the support from the aligned position to the transfer position with the shuttle in the withdrawn position with respect to the mold.

4. An in-mold label dispenser as in claim 1, 2 or 3 wherein the first actuator comprises an air cylinder having one end connected to the first base portion and another end connected to the support and being retractable and extendable to move the support rectilinearly between the aligned and transfer positions, the operator being an air cylinder having one end mounted on the support and another end connected to the shuttle to provide movement of the shuttle between the withdrawn and inserted positions, and the second actuator being an air cylinder having one end connected to the second base portion and another end connected to the second locator.

5. An in-mold label dispenser as in claim 4 wherein the operator cylinder includes a track and the shuttle including a slide that mounts the shuttle on the track for movement between the withdrawn and inserted positions with respect to the mold.

6. An in-mold label dispenser as in claim 5 wherein the control includes a sensor for sensing movement of the shuttle slide on the track to the withdrawn position.

7. An in-mold label dispenser as in claim 5 wherein the control includes a sensor that senses the engagement of the locators with each other as the shuttle is moved on the track to the inserted position.

8. An in-mold label dispenser as in claim 5 wherein the control includes a first sensor for sensing movement of the shuttle slide on the track to the withdrawn position, and the control also including a second sensor for sensing the engagement of the locators with each other as the shuttle is moved on the track to the inserted position with respect to the open mold.

9. An in-mold label dispenser as in claim 5 wherein the shuttle includes a skid, and a guide that connects the skid to the support so as to provide guided movement of the shuttle skid.

10. An in-mold label dispenser as in claim 9 wherein the shuttle includes a connector connected to the operator cylinder and to the skid, and a track connection member that extends from the connector and has a distal end secured to the slide movable along the track of the operator cylinder.

11. A in-mold label carrier as in claim 10 wherein the shuttle also includes a label carrier connection member that extends from the connector to the label carrier.

12. An in-mold label carrier as in claim 11 wherein the connector has an elongated shape that extends vertically between the skid, the operator cylinder, the track connection member, and the label carrier connection member.

13. An in-mold label dispenser as in claim 1, 2 or 3 wherein the slideway assembly includes a pair of spaced slideways mounted on the first base portion in a spaced relationship to each other.

14. An in-mold label dispenser as in claim 13 wherein each slideway includes an elongated slideway rod and a pair of mounts that support the slideway rod on the first base portion in a spaced relationship.

15. An in-mold label dispenser for a plastic blow molding machine including a mold having a pair of mold sections each of which includes a plurality of cavity sections, and said mold sections being movable toward and away from each other between an open position spaced from each other and a closed position where the cavity sections thereof cooperate to define enclosed cavities in which blow molding is performed, the in-mold label dispenser comprising: a base having first and second portions located on opposite sides of the mold; at least one label magazine mounted on the first base portion on one side of the mold; a rectilinear slideway assembly mounted on the first base portion; a support mounted by the rectilinear slideway assembly on the first base portion for rectilinear movement; a first actuator including an air cylinder that moves the support rectilinearly on the slideway assembly between an aligned position with respect to the open mold and a label transfer position; a shuttle mounted on the support for rectilinear movement therewith and for rectilinear movement with respect thereto toward and away from the mold; the shuttle including a first locator; a plurality of label carriers mounted on the shuttle in a fixed relationship with respect thereto and being operable to carry labels to the mold; an operator including an air cylinder mounted for movement on the support and being connected to the shuttle to move the shuttle between withdrawn and inserted positions with respect to the mold; and shuttle being located adjacent the label magazine in the withdrawn position to permit the label carriers thereon to receive labels; the operator then moving the shuttle to the inserted position with the support positioned by the air cylinder of the first actuator in the aligned position to position the label carriers and the labels carried thereby between the mold sections of the open mold; a second locator mounted on the second base portion for rectilinear movement parallel to the rectilinear movement of the support on the first base portion; a second actuator including an air cylinder that moves the second locator rectilinearly between an aligned position with respect to the open mold and a transfer position; the first and second locators being engaged as the shuttle is moved to the inserted position with the air cylinders of the first and second actuators providing the positioning in the aligned positions; the air cylinders of the first and second actuators moving the support and the engaged locators to the transfer position where the labels on the label carriers are transferred to the cavity sections of one mold section; and a control for operating the first and second actuators and the operator in coordination with each other to provide the transfer of labels from the magazine to the mold, the control including a first sensor for sensing movement of the shuttle to the withdrawn position, and the control also including a second sensor for sensing the engagement of the locators with each other as the shuttle is moved to the inserted position with respect to the open mold.

16. An in-mold label dispenser for a plastic blow molding machine including a mold having a pair of mold sections each of which includes a plurality of cavity sections, and said mold sections being movable toward and away from each other between an open position spaced from each other and a closed position where the cavity sections thereof cooperate to define enclosed cavities in which blow molding is performed, the in-mold label dispenser comprising: a base having first and second portions located on opposite sides of the mold; a plurality of label magazines mounted on the first base portion on one side of the mold; a rectilinear slideway assembly mounted on the first base portion; a support mounted by the rectilinear slideway assembly on the first base portion for rectilinear movement; a first actuator including an air cylinder that moves the support rectilinearly on the slideway assembly between an aligned position with respect to the open mold and a label transfer position; a shuttle mounted on the support for rectilinear movement therewith and for rectilinear movement with respect thereto toward and away from the mold; the shuttle including a slide and a first locator; a plurality of label carriers mounted on the shuttle in a fixed relationship with respect thereto and being operable to carry labels to the mold; an operator including an air cylinder mounted for movement on the support and having a track that mounts the shuttle slide for rectilinear movement on the support between the withdrawn and inserted positions with respect to the open mold; a connector that connects the shuttle to the operator cylinder to provide shuttle movement between the withdrawn and inserted positions under the impetus of the operator; said shuttle being located adjacent the label magazines in the withdrawn position to permit the label carriers thereon to receive labels therefrom; the operator then moving the shuttle to the inserted position with the support positioned by the air cylinder of the first actuator in the aligned position to position the label carriers and the labels carried thereby between the mold sections of the open mold; a second locator mounted on the second base portion for rectilinear movement parallel to the rectilinear movement of the support on the first base portion; a second actuator including an air cylinder that moves the second locator rectilinearly between an aligned position with respect to the open mold and a transfer position; the first and second locators being engaged as the shuttle is moved to the inserted position with the air cylinders of the first and second actuators providing the positioning in the aligned positions; the air cylinders of the first and second actuators moving the support and the engaged locators to the transfer position where the labels on the label carriers are transferred to the cavity sections of one mold section; and a control for operating the first and second actuators and the operator in coordination with each other to provide the transfer of labels from the magazine to the mold, the control including a first sensor for sensing movement of the shuttle slide on the track to the withdrawn position, and the control also including a second sensor for sensing the engagement of the locators with each other as the shuttle is moved on the track to the inserted position with respect to the open mold.

* * * * *

UNITED STATES PATENT AND TRADEMARK OFFICE
CERTIFICATE OF CORRECTION

PATENT NO. : 4,721,451

DATED : January 26, 1988

INVENTOR(S) : Richard C. Darr

It is certified that error appears in the above-identified patent and that said Letters Patent is hereby corrected as shown below:

Column 5, line 6, "313 3" should read -- 3-3 --.

Column 7, line 57, "83" should read -- 86 --.

Column 9, line 59, claim 3, "fixed" should read -- fixedly --.

Column 10, line 39, claim 11, "A" should read -- An --.

Column 11, line 15, claim 15, "and" should read -- said --.

Signed and Sealed this

Twenty-eighth Day of February, 1989

Attest:

DONALD J. QUIGG

Attesting Officer     Commissioner of Patents and Trademarks